(12) United States Patent
Watanabe

(10) Patent No.: US 7,680,792 B2
(45) Date of Patent: Mar. 16, 2010

(54) DOCUMENT MANAGEMENT SYSTEM AND DOCUMENT MANAGEMENT METHOD

(75) Inventor: Ryutaro Watanabe, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 11/300,051

(22) Filed: Dec. 14, 2005

(65) Prior Publication Data

US 2006/0136412 A1 Jun. 22, 2006

(30) Foreign Application Priority Data

Dec. 17, 2004 (JP) .............................. 2004-366008

(51) Int. Cl.
*G06F 17/30* (2006.01)
(52) U.S. Cl. .............................. 707/7; 707/10; 709/217
(58) Field of Classification Search ............... 707/1–10, 707/100–102; 709/217
See application file for complete search history.

(56) References Cited

U.S. PATENT DOCUMENTS

| 5,987,457 | A * | 11/1999 | Ballard ........................... 707/5 |
| 6,625,335 | B1 * | 9/2003 | Kanai ........................... 382/306 |
| 2003/0187837 | A1 * | 10/2003 | Culliss ........................... 707/3 |
| 2005/0138027 | A1 * | 6/2005 | Kawakita ....................... 707/5 |
| 2006/0020576 | A1 * | 1/2006 | Karube ........................... 707/2 |
| 2006/0048234 | A1 * | 3/2006 | Imaizumi et al. .............. 726/27 |

FOREIGN PATENT DOCUMENTS

| CN | 1497479 A | 5/2004 |
| JP | 10-269237 A | 10/1998 |

OTHER PUBLICATIONS

Hou et al., "A Document and User Matching Model Via Document Keyword Analysis", Journal of Computer Information Systems (0887-4417), Jun. 1, 2004. vol. 44,Iss.4;p. 1-15. Download: http://proquest.umi.com/pqdlink?Ver=1&Exp=10-29-2014&FMT=7&DID=679162881&RQT=309.*

* cited by examiner

*Primary Examiner*—Shahid A Alam
*Assistant Examiner*—Hares Jami
(74) *Attorney, Agent, or Firm*—Canon USA Inc IP Div

(57) ABSTRACT

There is provided a document management system for retrieving document information from storage unit which correlates and stores user information, keyword information set for every user, and document information, the document management system including a first retrieval unit configured to retrieve document information from the storage unit using a first retrieval condition, a specifying unit configured to specify the user information, and a second retrieval unit configured to determine a second retrieval condition in accordance with a retrieval result of the first retrieval unit and the user information specified by the specifying unit and to retrieve document information from the storage unit using the second retrieval condition.

9 Claims, 8 Drawing Sheets

| | USER 1 KEY 1 | USER 1 KEY 2 | USER 1 KEY 3 | USER 2 KEY 1 | USER 2 KEY 2 | USER 2 KEY 3 |
|---|---|---|---|---|---|---|
| DOCUMENT 1 | LARGE | DMS | DS44 | LARGE | 04/05 | END |
| DOCUMENT 2 | MEDIUM | Gateway | DS43 | MEDIUM | 04/20 | - |
| DOCUMENT 3 | SMALL | ScanManager | DS43 | SMALL | 03/21 | END |

FIG. 2

|  | USER 1 KEYWORD 1 | USER 1 KEYWORD 2 | USER 1 KEYWORD 3 | USER 2 KEYWORD 1 | USER 2 KEYWORD 2 | USER 2 KEYWORD 3 | USER 3 ... |
|---|---|---|---|---|---|---|---|
| DOCUMENT 1 | LARGE | DMS | DS44 | | | | |
| DOCUMENT 2 | MEDIUM | Gateway | DS43 | | | | |
| DOCUMENT 3 | SMALL | ScanManager | DS43 | | | | |

FIG. 3

|  | USER 1 KEY 1 | USER 1 KEY 2 | USER 1 KEY 3 | USER 2 KEY 1 | USER 2 KEY 2 | USER 2 KEY 3 |
|---|---|---|---|---|---|---|
| DOCUMENT 1 | LARGE | DMS | DS44 | LARGE | 04/05 | END |
| DOCUMENT 2 | MEDIUM | Gateway | DS43 | MEDIUM | 04/20 | — |
| DOCUMENT 3 | SMALL | ScanManager | DS43 | SMALL | 03/21 | END |

FIG. 4

```
<?xml version="1.0" encoding="Shift-JIS" ?>
- <KEYWORDS>
   - <DOCUMENT ID="1">
       <USER ID="1">Document Manager</USER>
       <USER ID="2">DMS</USER>
     </DOCUMENT>
   - <DOCUMENT ID="2">
       <USER ID="1">Document Manager</USER>
       <USER ID="2">DMS</USER>
     </DOCUMENT>
   - <DOCUMENT ID="3">
       <USER ID="1">Document Manager</USER>
       <USER ID="2">DMS</USER>
     </DOCUMENT>
   - <DOCUMENT ID="4">
       <USER ID="1">Document Manager</USER>
       <USER ID="2">DMS Web</USER>
     </DOCUMENT>
   - <DOCUMENT ID="5">
       <USER ID="2">DMS</USER>
     </DOCUMENT>
   - <DOCUMENT ID="6">
       <USER ID="2">Gateway</USER>
     </DOCUMENT>
   - <DOCUMENT ID="7">
       <USER ID="3">Document Manager</USER>
     </DOCUMENT>
  </KEYWORDS>
```

FIG. 5

```
<?xml version="1.0" encoding="Shift-JIS" ?>
- <KEYWORDS>
    - <DOCUMENT ID="1">
        <USER ID="1">Document Manager</USER>
        <USER ID="2">DMS</USER>
    </DOCUMENT>
    - <DOCUMENT ID="2">
        <USER ID="1">Document Manager</USER>
        <USER ID="2">DMS</USER>
    </DOCUMENT>
    - <DOCUMENT ID="3">
        <USER ID="1">Document Manager</USER>
        <USER ID="2">DMS</USER>
    </DOCUMENT>
    - <DOCUMENT ID="4">
        <USER ID="1">Document Manager</USER>
        <USER ID="2">DMS Web</USER>
    </DOCUMENT>
</KEYWORDS>
```

FIG. 8

```xml
<?xml version="1.0" encoding="Shift-JIS" ?>
<KEYWORDS>
- <DOCUMENT ID="1">
    <USER ID="1">Document Manager</USER>
    <USER ID="2">DMS</USER>
  </DOCUMENT>
- <DOCUMENT ID="2">
    <USER ID="1">Document Manager</USER>
    <USER ID="2">DMS</USER>
  </DOCUMENT>
- <DOCUMENT ID="3">
    <USER ID="1">Document Manager</USER>
    <USER ID="2">DMS</USER>
  </DOCUMENT>
- <DOCUMENT ID="4">
    <USER ID="1">Document Manager</USER>
    <USER ID="2">DMS Web</USER>
  </DOCUMENT>
</KEYWORDS>
```

```xml
<?xml version="1.0" encoding="Shift-JIS" ?>
<KEYWORDS>
- <DOCUMENT ID="5">
    <USER ID="2">DMS</USER>
  </DOCUMENT>
- <DOCUMENT ID="6">
    <USER ID="2">Gateway</USER>
  </DOCUMENT>
- <DOCUMENT ID="7">
    <USER ID="3">Document Manager</USER>
  </DOCUMENT>
</KEYWORDS>
```

```xml
<?xml version="1.0" encoding="Shift-JIS" ?>
<KEYWORDS>
- <DOCUMENT ID="1">
    <USER ID="1">Document Manager</USER>
    <USER ID="2">DMS</USER>
  </DOCUMENT>
- <DOCUMENT ID="2">
    <USER ID="1">Document Manager</USER>
    <USER ID="2">DMS</USER>
  </DOCUMENT>
- <DOCUMENT ID="3">
    <USER ID="1">Document Manager</USER>
    <USER ID="2">DMS</USER>
  </DOCUMENT>
- <DOCUMENT ID="4">
    <USER ID="1">Document Manager</USER>
    <USER ID="2">DMS Web</USER>
  </DOCUMENT>
- <DOCUMENT ID="5">
    <USER ID="2">DMS</USER>
  </DOCUMENT>
- <DOCUMENT ID="6">
    <USER ID="2">Gateway</USER>
  </DOCUMENT>
- <DOCUMENT ID="7">
    <USER ID="3">Document Manager</USER>
  </DOCUMENT>
</KEYWORDS>
```

DOCUMENT MANAGEMENT SYSTEM AND DOCUMENT MANAGEMENT METHOD

BACKGROUND OF THE INVENTION

1. Field of the Invention

The present invention relates to a document management system and method thereof for retrieving a related document.

2. Description of the Related Art

Recently, a document management system (a document browsing system) which can retrieve a related document has been proposed.

For example, in the document browsing system described in Japanese Patent Laid-Open No. 10-269237, a keyword is extracted from a browsed document, by referring to keyword information registered beforehand, according to a field, a user etc., and the related document is retrieved using the extracted keyword.

However, in the above-described document browsing system, a user keyword must be defined beforehand for every user. Therefore, in Japanese Patent Laid-Open No. 10-269237, it is necessary to spend time and effort registering a user's keyword in advance.

In addition, since the keyword information is exclusive to each user, there is the limitation that keyword information is unsharable among different users. Also, since the retrieval of the related document is performed for all documents stored in a document database, retrieval of the related document is not efficient. Since the keyword information for every user is stored by the relational database, there is a problem that, when information related to a user is added, a table or a column must be added for the database and a system which accesses it must be modified.

SUMMARY OF THE INVENTION

In view of the above problems in the conventional art, the present invention is directed to providing a document management system and method which can efficiently retrieve a related document.

In accordance with an aspect of the present invention, a document management system for retrieving desired document information from a storage unit which correlates and stores user information, keyword information set for every user, and document information, the document management system includes a first retrieval unit configured to retrieve document information from the storage unit using a first retrieval condition, a specifying unit configured to specify the user information, and a second retrieval unit configured to determine a second retrieval condition in accordance with a retrieval result of the first retrieval unit and the user information specified by the specifying unit and to retrieve document information from the storage unit using the second retrieval condition.

In accordance with another aspect of the present invention, a document management method for retrieving desired document information from a storage unit which correlates and stores user information, keyword information set for every user, and document information, the document management method includes a first retrieving step of retrieving document information from the storage unit using a first retrieval condition, a specifying step of specifying the user information, and a second retrieving step of determining a second retrieval condition in accordance with a retrieval result of the first retrieving step and the user information specified in the specifying step and retrieving document information from the storage unit using the second retrieval condition.

Further features and aspects of the present invention will become apparent from the following description of exemplary embodiments with reference to the attached drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 illustrates an example of storing a keyword for every user in a third embodiment of the present invention.

FIG. 3 illustrates an example of storing a keyword for every user in a fourth embodiment of the present invention.

FIG. 4 illustrates an example of storing a keyword for every user by a structured document in a first embodiment of the present invention.

FIG. 5 illustrates an example of a result of retrieval by a keyword in the first embodiment of the present invention.

FIG. 8 illustrates an example of division of a document set in the second embodiment of the present invention.

DESCRIPTION OF THE EMBODIMENTS

Exemplary embodiments of the invention are described in detail below with reference to the accompanying drawings. The relative layout of constitute elements exemplified in the embodiments should appropriately be changed in accordance with the arrangement and conditions of the apparatus to which the present invention is applied. The present invention is not limited to these illustrative embodiments.

First Embodiment

Figure 1:
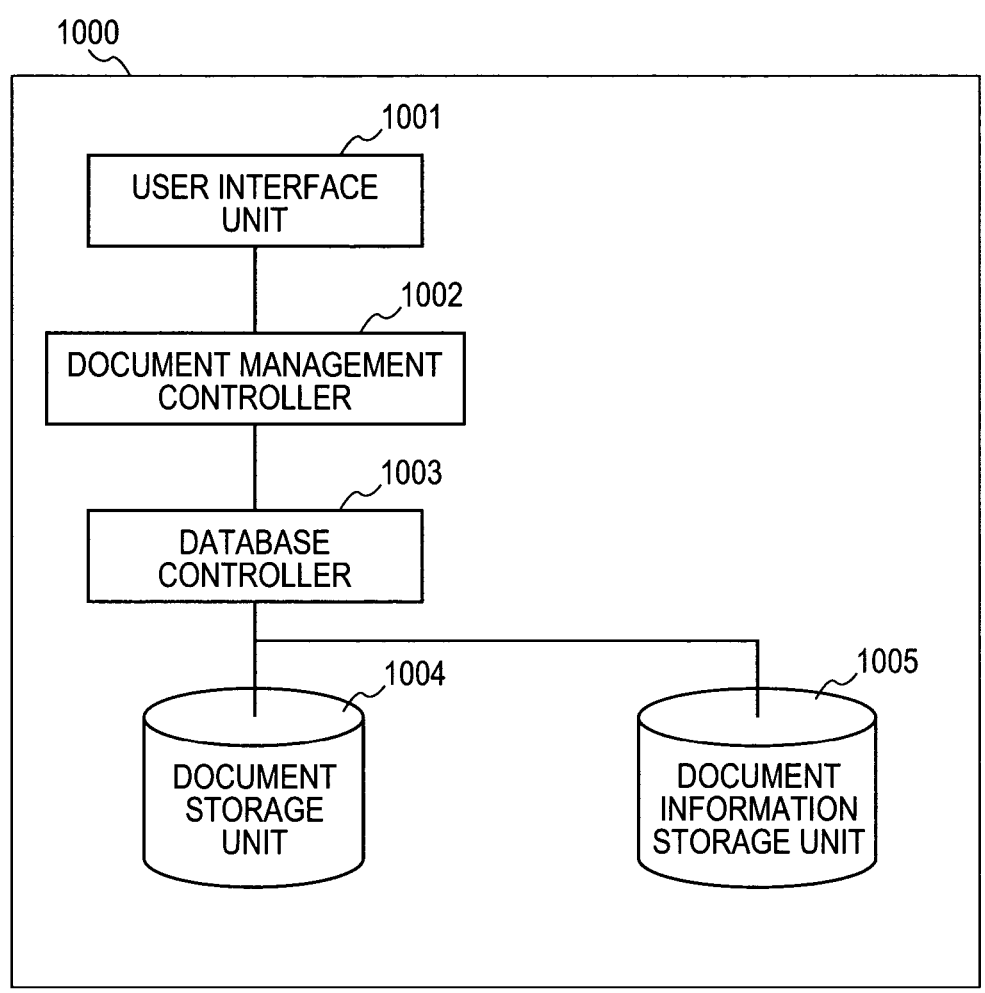
FIG. 1 is an exemplary block diagram of a document management system in an embodiment of the present invention.

FIG. 1 is an exemplary block diagram of a document management system in an embodiment of the present invention. A document management system 1000 in this embodiment is realized by software which operates on a system which comprises a general-purpose computer. A user interface unit 1001 inputs a user's operation. The document management system 1000 receives the user's operation via the user interface unit 1001, and sends the user's operation to a document management controller 1002. The document management controller 1002 transmits the operation request corresponding to the user's operation to a database controller 1003, in cases where the user's operation is received.

The database controller 1003 controls a database according to the operation request. For example, in cases where the operation request is a storing request of a document, the document is stored in a document storage unit 1004, and document information with respect to the document is stored in a document information storage unit 1005. In cases where it is a document acquisition request, the document is acquired from the document storage unit 1004, and the document information is acquired from the document information storage unit 1005.

In the document storage unit 1004, the document data itself is stored. In the document information storage unit 1005, information relevant to each document data is stored.

Figure 9:
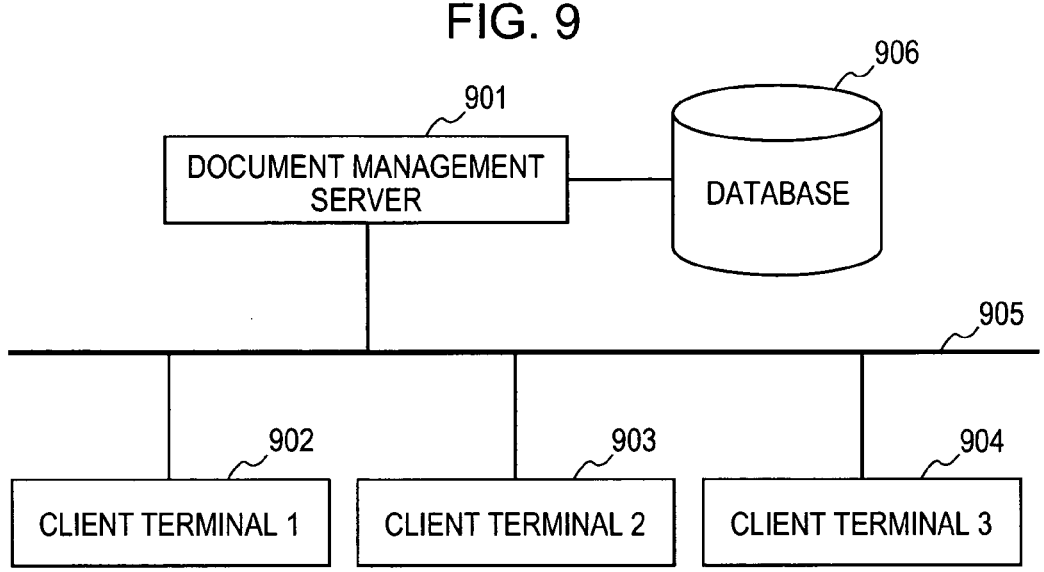
FIG. 9 illustrates a system configuration of the document management system in an embodiment of the present invention.

FIG. 9 illustrates a system configuration of the document management system of FIG. 1. A document management server 901 is connected with client terminals 902 to 904 via a network 905, such as LAN or the Internet. In the system configuration of FIG. 9, the user interface unit 1001 is in the client terminal. The document management control unit 1002 and the database controller 1003 are in the document management server 901. The document storage unit 1004 and the document information storage unit 1005 are in a database 906. The document management control unit 1002 receives the operation request corresponding to the user's operation from client terminal 902, 903 or 904 via the network 905. The document management controller 1002 sends the operation request corresponding to the user's operation to the database controller 1003. The present invention is not limited to the system configuration illustrated in FIG. 9. Any system configuration that would enable practice of the present invention is applicable. For example, although database 906, which as described above includes the document storage unit 1004 and the document information storage unit 1005 is connected to the document management server 901, it may be connected to a file server (not shown) on network 905.

Retrieval-by-Keyword Processing Using User Identification (ID)

The flow of the retrieval-by-keyword processing according to the first embodiment of the present invention is described below.

The processing associated with setting up the keyword for a document is described below. First, each user inputs and sets up a keyword for every document by using the user interface unit 1001. The user interface unit 1001 transmits information associated with the operation performed by the user and a user ID for identifying the user to the document management controller 1002. The document management controller 1002 determines the operation request based on the received information of the user's operation. In cases where the operation request is a keyword setting request, the document information storage unit 1005 stores the user ID, the keyword, and a document ID for identifying the document via the database controller 1003. The user ID, the keyword, and the document ID are correlated with one another and stored in the document information storage unit 1005.

FIG. 4 illustrates an example of storing the keyword for every user in the document information storage 1005 via a structured document. The structured document includes a structure divided by the document ID. The structure divided by the document ID is further divided by the user ID. The keyword is stored in a structure divided by the user ID. The keyword can be stored by one structured document file, without having to modify the database structure, even if the number of users increases. Since the keyword is stored for every user as described above, a document can be retrieved by not only using the keyword set by the operator, but also by using the keyword set by other users specified based on the operator's designation.

Figure 10:
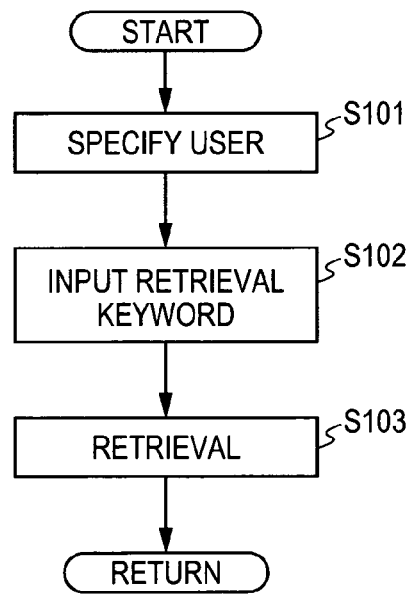
FIG. 10 is a flowchart illustrating an exemplary retrieval processing performed by using a keyword of a specified user in an embodiment of the present invention.

The retrieval processing performed by using a keyword of a specified user is illustrated using FIG. 10. In step S101, a user is specified by specifying a user ID, which is used in the retrieval-by-keyword processing. Next, in step S102, the keyword used for the retrieval of a document is inputted by the operator. In step S103, the retrieval processing is performed using the user ID specified in step S101 and the keyword inputted in step S102.

An example of the retrieval processing using a keyword of a specified user will now be described. As shown in FIG. 4, keywords "Document Manager," "DMS," "DMS Web," and "Gateway" are associated with a user ID (i.e., "USER ID") are stored in correlation to a document ID (i.e., "DOCUMENT ID"). FIG. 5 depicts an example of a retrieval result where the specified user ID is "1", the associated document is retrieved using the keyword "Document Manager" which was set by the user with the user ID value of "1". The system of the present embodiment is arranged as follows. In step S101, if the operator does not designate the user ID for specifying the user, a document is automatically retrieved using the keyword associated with the user ID of the operator. On the other hand, in step S101, if the operator designates the specified user ID, a document is retrieved using the keyword associated the specified user ID designated by the operator. Furthermore, the system of the present invention allows for specifying a plurality of user IDs and retrieval of a document based on the plurality of specified user IDs.

Thus, according to the present embodiment, a document can be retrieved using a keyword set by specified users.

Related Document Retrieval Processing

In another embodiment of the present invention, a related document can be retrieved by specifying the user ID of another user after a first retrieval processing (e.g. the retrieval-by-keyword using an user ID and a keyword described above) is executed.

Figure 6:
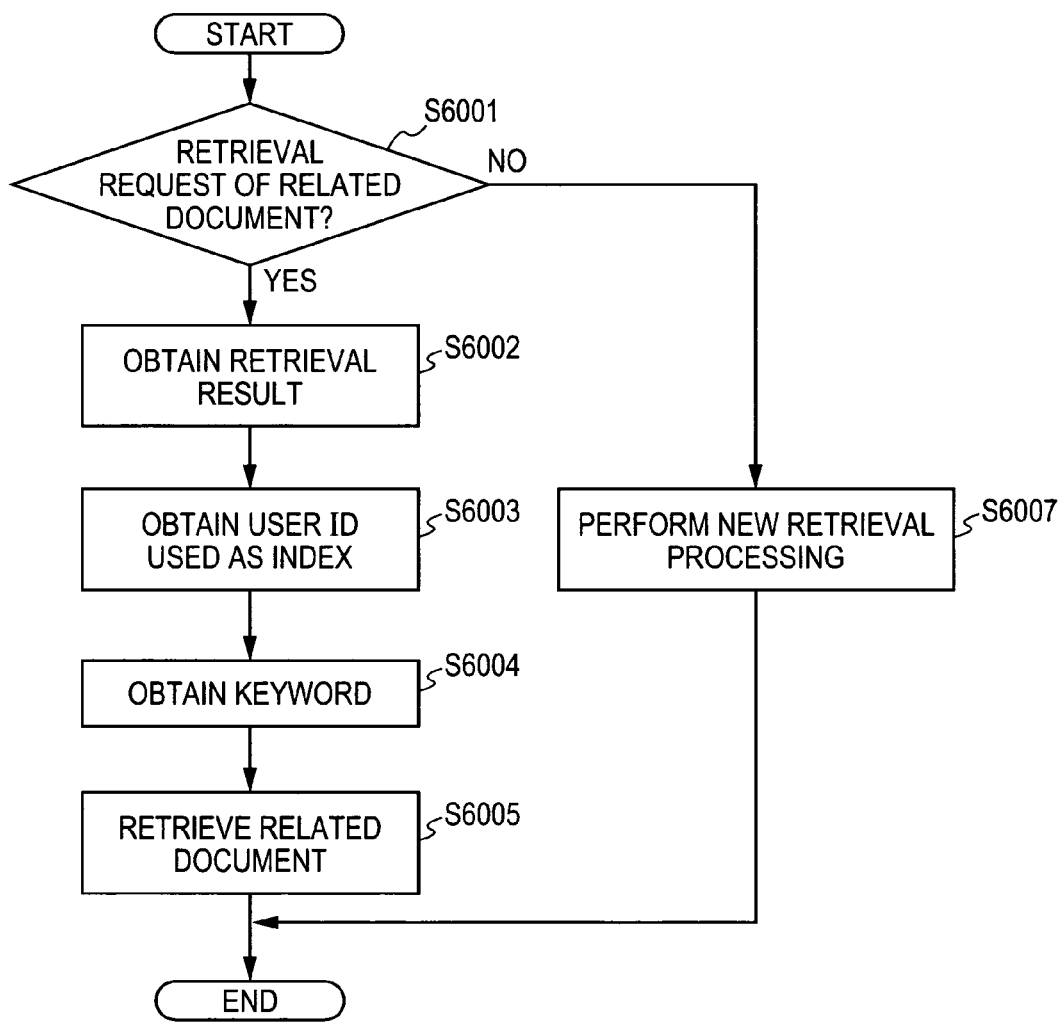
FIG. 6 is a flowchart illustrating an exemplary retrieval processing of a related document in the first embodiment of the present invention.

The flow associated with the retrieval process for retrieving a related document is depicted in FIG. 6. First, in step S6001, in cases where the user inputs an additional retrieval request after the first retrieval processing (e.g. FIG. 10) is executed (i.e., after displaying the first retrieval result based on the structured document of the retrieval result of FIG. 5), it is determined whether the additional retrieval request is a retrieval request of the related document.

If the additional retrieval request is not a retrieval request of the related document, the processing proceeds to step S6007. In step S6007, a new retrieval process, as described above with respect to FIG. 10, is initiated.

If the additional retrieval request is the retrieval request of the related document, the processing proceeds to step S6002. In step S6002, the first retrieval result (e.g. retrieval result obtained by the keyword "Document Manager" set by the specified user ID "1" as shown in FIG. 5) is retrieved.

Next, in step S6003, the user ID (e.g. user ID "2") used as an index at the time of retrieving the related document is obtained.

In step S6004, new keyword for retrieving the related document is obtained based on the first retrieval result obtained in step S6002 and the user ID obtained in step S6003. The obtained keyword is, from keywords contained in the first retrieval result obtained in step S6002, the keyword most frequently set by the user ID obtained in step S6003. However, the keyword obtained in step S6004 is not limited to the most frequently set keyword. For example, the obtained keyword can be at least one keyword that is set in a ratio more than a predetermined ratio for the documents of the first retrieval result. Or, the obtained keyword may be based on a ranking system, where the keyword is assigned a ranking higher than a predetermined ranking.

Next, in step S6005, the related document is retrieved, using the keyword obtained in step S6004, from the structured document (shown in FIG. 4) stored in the document information storage unit 1005.

For example, after the first retrieval result based on the keyword "Document Manager" of the user ID "1" is displayed, user ID "2" is specified (in step S6003) in response to the retrieval request of the related document relevant to the first retrieval result. In this case, since the most frequently set keyword by the user ID "2" in FIG. 5 is "DMS", the retrieval-by-keyword of the structured document of FIG. 4 is performed using the keyword "DMS" of the user ID "2." The document IDs "1," "2," "3," and "5" are extracted by the above-described retrieval processing, the difference of this result and the result of FIG. 5 is taken, and the document ID "5" is displayed as the related document.

Thus, using the document management system in the present embodiment, a user can retrieve, by specifying other user as the index, the related document which was not included when the first retrieval-by-keyword processing was performed using the keyword set by a certain user. When retrieving the related document, a plurality of users may be specified as the index.

In the first embodiment, since the keyword information for every user is stored with the structured document, even if the number of users fluctuates, it is not necessary to significantly modify the database and the system which accesses the database.

Second Embodiment

Figure 7:
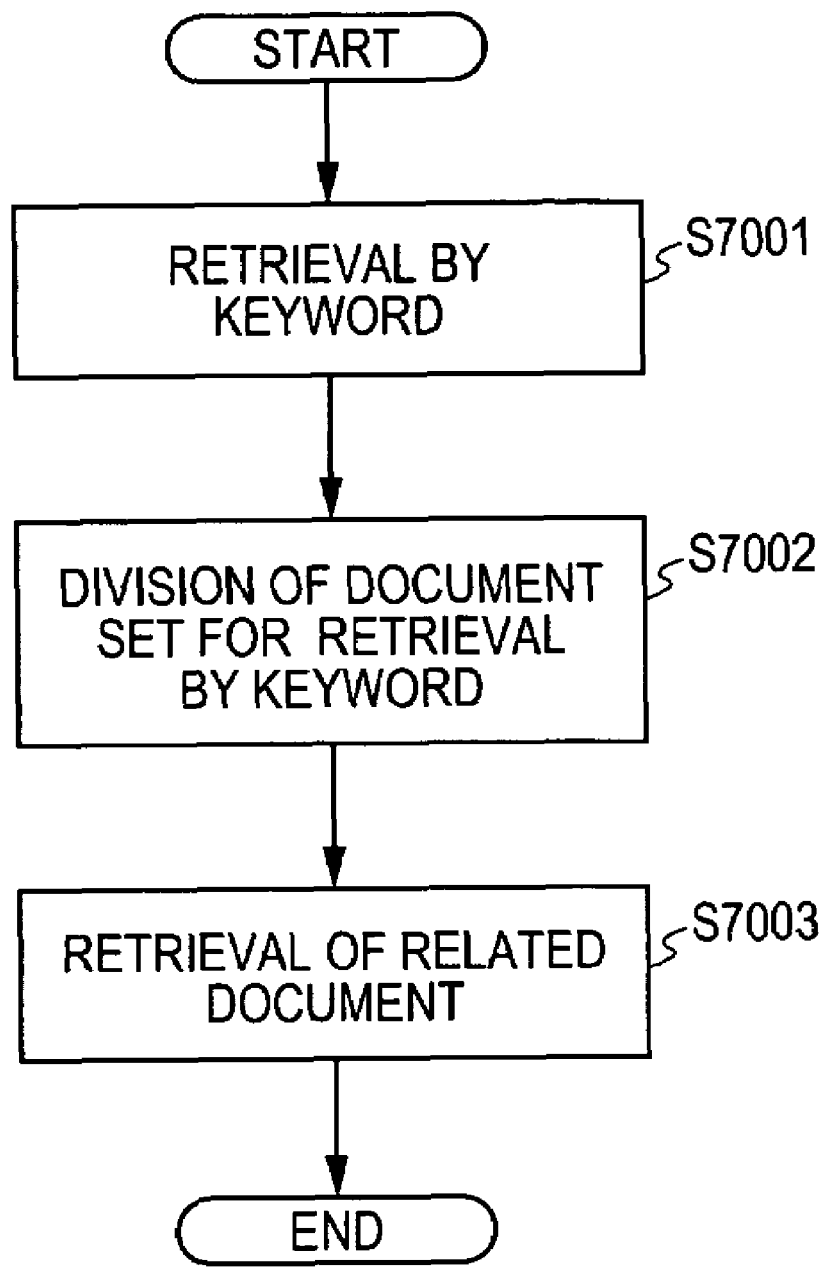
FIG. 7 is a flowchart illustrating an exemplary retrieval processing of a related document in a second embodiment of the present invention.

In the related document retrieval processing of the first embodiment, after specifying the index user (user ID used as index for the related document retrieval processing) in step S6003, the retrieval of the related document was performed from the entire structured document of FIG. 4 in step S6005. However, the related document may also be retrieved after removing the document of the retrieval result (shown in FIG. 5) from the structured document of FIG. 4. This process is described below with respect to FIG. 7.

First, in step S7001, the first retrieval-by-keyword is performed by specifying a user ID and a keyword. For example, the retrieval-by-keyword is performed using user ID "1" and keyword "Document Manager". This retrieval process is the same as the process flow described above with respect to FIG. 10.

Next, in step S7002, the original document set (shown in FIG. 4) is divided into the document set contained in the first retrieval result (shown in FIG. 5) of step S7001, and the document set which is not contained in the first retrieval result of step S7001. FIG. 8 illustrates the example of dividing the original document set into the document set contained in the first retrieval result and the document set that is not contained in the retrieval result. More specially, FIG. 8 illustrates the example of division where the document set of FIG. 4 is retrieved using the keyword "Document Manager" and the user ID "1".

Turning back to FIG. 7, in step S7003, when the index user (user ID used as index for the related document retrieval processing) (the user ID="2") is designated by the operator, new keyword used for the related document retrieval process is specified based on the document set contained in the first retrieval result, and then the related document is retrieved from the document set which is not contained in the first retrieval result. In the present example; after obtaining, from the retrieval result of FIG. 5 (=the upper right section of FIG. 8), the keyword "DMS" which the index user (user ID used as index for the related document retrieval processing) (user ID="2") set most frequently, the related document is retrieved from the document set depicted in the lower right section of FIG. 8 by using the obtained keyword.

According to the second embodiment, since the related document can be retrieved from a smaller document set, retrieval of the related document can be accomplished more efficiently.

As explained above, according to the present embodiment, the retrieval-by-keyword and the related document retrieval can be efficiently performed using the keyword which a different user(s) set.

In cases where the related document is retrieved, the user does not need to separately define a related term. Since the keyword set by different users can be used for retrieval, the user can also retrieve a document which failed to attach a keyword.

In the second embodiment, since the keyword information for every user is stored with the structured document, even if the number of users fluctuates, it is not necessary to significantly modify the database and the system which accesses the database. It is also not necessary to significantly modify the structure of a structured document.

In the second embodiment, since the retrieval of the related document is performed after the document set is divided using the retrieval result of the retrieval-by-keyword, unnecessary retrieval can be prevented.

Third Embodiment

In the above-described embodiments, keyword management of the document information storage unit 1005 was performed using the structured document as shown in FIG. 4. In the present embodiment, keyword management of the document information storage unit 1005 is performed using a table. More specifically, the document information storage unit 105 is configured to store the keyword information set according to each user for each document in a table format, wherein there is one table per user. For example, as shown in FIG. 2, a table is prepared for every user and the keyword for every user is stored by adding the keyword to the corresponding user table.

Fourth Embodiment

In the above-described embodiments, keyword management of the document information storage unit 1005 was performed using the structured document as shown in FIG. 4 or by using a table for each user as shown in FIG. 2. In the present embodiment, keyword management of the document information storage unit 1005 is also performed using a table. However, unlike the previous embodiment, in the present embodiment, one table containing all the users is used instead of individual tables for each user. For example, as shown in FIG. 3, a column is prepared for every user and every keyword associated with a particular user. Additional columns are added whenever the number of users and/or associated keywords increases.

Other Embodiments

The present invention can be applied to an apparatus consisting of a single device or to system including a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

In this case, so long as the system or apparatus has the functions of the program, the program may be executed in any form, such as object code, a program executed by an interpreter, or script data supplied to an operating system (OS).

Example of storage media that can be used for supplying the program include a floppy disk, a hard disk, an optical disk, a magneto-optical disk, a CD-ROM (compact disk-ROM), a CD-R (CD-recordable), a CD-RW (CD-rewritable), a magnetic tape, a non-volatile type memory card, a ROM, a DVD (digital versatile disk, e.g., a DVD-ROM and a DVD-R), and a Blu-ray Disc.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer. In addition to the cases where the aforementioned functions according to the embodiments are implemented by executing the read program by computer and an operating system or the like running on the computer may perform all or a part of the actual processing so that the functions of the foregoing embodiments can be implemented by this processing. After the program is read from the storage medium it can be written to a function expansion board inserted into the computer or to a memory provided in a function expansion unit connected to the computer. A central processing unit (CPU) or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2004-366008, filed Dec. 17, 2004, which is hereby incorporated by reference herein.

What is claimed is:

1. A document management system for retrieving document information from a storage unit which correlates and stores user information, a first keyword set by a first user, a second keyword set by a second user, and document information, wherein the document management system is implemented by executing a computer-executable process stored in a computer-readable storage medium by at least one computer, the document management system comprising:
   a first retrieval unit configured to retrieve document information from the storage unit based on a first retrieval condition including a keyword input by an operator and the user information of the first user,
   wherein the document information retrieved by the first retrieval unit correlates with the first keyword set by the first user and the user information of the first user, the first keyword including the keyword input by the operator;
   a specifying unit configured to specify the second user designated by the operator after the first retrieval unit retrieves the document information based on the first retrieval condition, wherein the second user is different from the first user; and
   a second retrieval unit configured to determine the second keyword in accordance with a keyword of a ranking higher than a predetermined ranking in keywords which are correlated with the document information retrieved by the first retrieval unit and which are set by the second user specified by the specifying unit, and to retrieve another document information from the storage unit based on a second retrieval condition including the determined second keyword and the user information of the second user,
   wherein the another document information retrieved by the second retrieval unit correlates with the determined second keyword set by the second user and the user information of the second user.

2. A document management system according to claim 1, wherein the second retrieval unit retrieves the another document information correlated with the second keyword set by the second user from the document information after removing the document information of the retrieval result of the first retrieval unit from the document information stored in the storage unit.

3. A document management system according to claim 1, wherein the storage unit is configured to store the first keyword set by the first user and the second keyword set by the second user for each document in a structured document format.

4. A document management system according to claim 1, wherein the storage unit is configured to store the first keyword set by the first user and the second keyword set by the second user for each document in a table format, wherein there is one table per user.

5. A document management system according to claim 1, wherein the storage unit is configured to store the first keyword set by the user and the second keyword set by the second user for each document in a table format, wherein a single table is used for all users.

6. A document management system according to claim 1, further comprising:
   a keyword setting unit configured to set a keyword for each document information for every user; and
   a storage controller configured to control the storage unit to correlate and store the keyword set by the keyword setting unit, the user information, and the document information.

7. A document management method for retrieving document information from a storage unit which correlates and stores user information, a first keyword set by a first user, a second keyword set by a second user, and document information, the document management method comprising:
   retrieving, at a first retrieving unit, document information from the storage unit based on a first retrieval condition including a keyword input by an operator and user information of the first user,
   wherein the document information retrieved by the first retrieval unit correlates with the first keyword set by the first user and the user information of the first user, the first keyword including the keyword input by the operator;

specifying the second user designated by the operator after the document information is retrieved based on the first retrieval condition in the first retrieval step, wherein the second user is different from the first user; and determining the second keyword in accordance with a keyword of a ranking higher than a predetermined ranking in keywords which are correlated with the document information retrieved by the first retrieval unit and which are set by the second user; and retrieving, at a second retrieving unit, another document information from the storage unit based on a second retrieval condition including the determined second keyword and the user information of the second user.

8. A document management method according to claim 7, wherein the second retrieving step retrieves the document information correlated with the second keyword set by the second user, from the document information after removing the document information of the retrieval result of the first retrieving step from the document information stored in the storage unit.

9. A computer-readable storage medium for storing a computer-executable process, the computer-executable process causing a computer to perform the document management method according to claim 7.

* * * * *